(12) United States Patent
Jeong et al.

(10) Patent No.: US 8,483,551 B2
(45) Date of Patent: Jul. 9, 2013

(54) METHOD FOR GENERATING DOUBLE-SPEED IDR-UNIT FOR TRICK PLAY, AND TRICK PLAY SYSTEM AND METHOD USING THE SAME

(75) Inventors: Jin-Hwan Jeong, Seoul (KR); Jung-Keun Kim, Daejon (KR); Yong-Ju Lee, Daejon (KR); Choon-Seo Park, Daejon (KR); Ok-Gee Min, Daejon (KR); Hag-Young Kim, Daejon (KR); Myung-Joon Kim, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 1329 days.

(21) Appl. No.: 11/949,746

(22) Filed: Dec. 3, 2007

(65) Prior Publication Data
US 2008/0131078 A1   Jun. 5, 2008

(30) Foreign Application Priority Data

Dec. 4, 2006 (KR) .................. 10-2006-0121275
Oct. 4, 2007 (KR) .................. 10-2007-0099982

(51) Int. Cl.
*H04N 5/783* (2006.01)

(52) U.S. Cl.
USPC .............................................. 386/345

(58) Field of Classification Search
USPC .................................. 386/343, 345; 725/90
See application file for complete search history.

(56) References Cited

U.S. PATENT DOCUMENTS

| 6,621,979 | B1 * | 9/2003 | Eerenberg et al. | 386/346 |
| 7,127,152 | B2 * | 10/2006 | Van Den Enden | 386/346 |
| 8,179,978 | B2 * | 5/2012 | Herrick et al. | 375/240.25 |
| 8,279,946 | B2 * | 10/2012 | Mak-Fan et al. | 375/240.28 |
| 8,296,813 | B2 * | 10/2012 | Berkey et al. | 725/96 |
| 2002/0124259 | A1 * | 9/2002 | Chang et al. | 725/91 |
| 2003/0159152 | A1 * | 8/2003 | Lin et al. | 725/87 |
| 2004/0223735 | A1 * | 11/2004 | Lin et al. | 386/68 |
| 2005/0074225 | A1 * | 4/2005 | Lin et al. | 386/46 |

(Continued)

FOREIGN PATENT DOCUMENTS

| KR | 2002-0014857 A | 2/2002 |
| KR | 2003-0008997 A | 1/2003 |

(Continued)

OTHER PUBLICATIONS

"A Low-Cost Unrestricted Fast Playback Scheme for Video Streaming" Chun-Ming Huang et al., IEEE Transactions on Circuits and Systems, vol. 52, No. 7, pp. 384-388, Jul. 2005.

*Primary Examiner* — David Harvey
(74) *Attorney, Agent, or Firm* — Rabin & Berdo, P.C.

(57) ABSTRACT

Provided are a method for generating an instantaneous decoding refresh (IDR) unit for trick play, and a trick play system and method using the same. The trick play system includes: a speed information input unit configured to receive a speed value; a transmission condition determining unit configured to determine instantaneous decoding refresh (IDR) transmission conditions based on the speed value inputted through the speed information input unit; a double-speed IDR-unit generating unit configured to generate a double-speed IDR-unit by adjusting the number and data size of video frames to be transmitted in accordance with the transmission conditions determined by the transmission condition determining unit; and a transmitting unit configured to transmit the generated double-speed IDR-unit to an external user terminal.

13 Claims, 3 Drawing Sheets

U.S. PATENT DOCUMENTS

| | | | |
|---|---|---|---|
| 2005/0155072 A1* | 7/2005 | Kaczowka et al. | 725/95 |
| 2007/0025688 A1* | 2/2007 | Pejhan | 386/68 |
| 2007/0028026 A1* | 2/2007 | Yeh et al. | 711/4 |
| 2007/0076796 A1* | 4/2007 | Shi et al. | 375/240.16 |
| 2007/0127881 A1* | 6/2007 | Iwamura | 386/68 |

FOREIGN PATENT DOCUMENTS

| | | |
|---|---|---|
| KR | 10-2004-0045893 | 6/2004 |
| KR | 2006-0017769 A | 2/2006 |
| WO | WO-2005/050999 A1 | 6/2005 |

* cited by examiner

METHOD FOR GENERATING DOUBLE-SPEED IDR-UNIT FOR TRICK PLAY, AND TRICK PLAY SYSTEM AND METHOD USING THE SAME

CROSS-REFERENCES TO RELATED APPLICATIONS

The present invention claims priority of Korean Patent Application Nos. 10-2006-0121275 and 10-2007-0099982, filed on Dec. 4, 2006, and Oct. 4, 2007, respectively, which are incorporated herein by reference.

BACKGROUND OF THE INVENTION

1. Field of the Invention

The present invention relates to a method for generating a double-speed instantaneous decoding refresh (IDR)-unit for trick play, and a trick play system and method using the same. More particularly, a double-speed IDR-unit for trick play is generated by controlling the number and data size of video frames in a trick play system, so that a bit rate of original contents can be maintained and a load on a server can be minimized, thereby controlling a trick play speed.

The IDR-unit includes an IDR frame and all prediction frames between an IDR frame and the next IDR frame. The double-speed IDR-unit represents a group of frames to be "transmitted" at a time during a trick play, and the double-speed IDR-unit includes the IDR frame and prediction frames which are selected based on predetermined conditions.

This work was supported by the Information Technology (IT) research and development program of the Korean Ministry of Information and Communication (MIC) and the Korean Institute for Information Technology Advancement (IITA) [2005-S-405-02, "A Development of the Next Generation Internet Server Technology"].

2. Description of Related Art

In a video on demand (VoD) system, the support of a trick play function similar to a fast forward function of a video cassette recorder (VCR) is very important in view of a user's convenience.

Many methods for implementing the trick play of the VoD system have been developed. Examples of the methods include a frame periodic selection method, a group of picture (GOP) level selection method, and a trick-play dedicated content generating method, based on Moving Picture Experts Group-4 (MPEG-4) or H.263 contents.

There are two types of trick play methods.

The first method is to implement a trick play speed by periodically removing frames from original contents. This method can efficiently control the trick play speed without placing a load on a server, but it cannot maintain a bit rate because the trick play speed is implemented by regularly selecting frames without considering a size of a compressed frame.

If the bit rate is changed, an incorrect bit rate is informed to the terminal in an initial setting operation through a control protocol such as Real-Time Streaming Protocol (RTSP) when a streaming begins. Since hardware of the terminal may cause a malfunction of a buffer, a correct streaming is difficult.

The second method is to transmit trick-play contents encoded from the original contents. It is a simple encoding method for allowing a server to control a bit rate of contents in real time. This method can solve the problem of the first method, but it may degrade a real-time characteristic. Further, only if the encoding, either simple or complicated, is performed, a heavy load is placed on a server when a plurality of terminals are connected. Since the algorithm of H.264 standard is more complex than that of an existing video compression standard, the load on the server increases.

Therefore, there is a need for methods that can provide a high-speed effect in an H.264 system by correctly transmitting the contents while maintaining the bit rate of the original contents.

SUMMARY OF THE INVENTION

An embodiment of the present invention is directed to providing a method for generating a double-speed instantaneous decoding refresh (IDR)-unit for trick play, and a trick play system and method using the same. More particularly, a double-speed IDR-unit for trick play is generated by controlling the number and data size of video frames in a trick play system, so that a bit rate of original contents can be maintained and a load on a server can be minimized, thereby controlling a trick play speed.

In accordance with an aspect of the present invention, there is provided a trick play system, including: a speed information input unit configured to receive a speed value; a transmission condition determining unit configured to determine instantaneous decoding refresh (IDR) transmission conditions based on the speed value inputted through the speed information input unit; a double-speed IDR-unit generating unit configured to generate a double-speed IDR-unit by adjusting the number and data size of video frames to be transmitted in accordance with the transmission conditions determined by the transmission condition determining unit; and a transmitting unit configured to transmit the generated double-speed IDR-unit to an external user terminal.

In accordance with another aspect of the present invention, there is provided a trick play method, including: receiving a speed value; determining instantaneous decoding refresh (IDR) transmission conditions based on the speed value; generating a double-speed IDR-unit by adjusting the number and data size of video frames to be transmitted in accordance with the determined transmission conditions; and transmitting the generated double-speed IDR-unit to a user terminal.

In accordance with another aspect of the present invention, there is provided a method for generating instantaneous decoding refresh (IDR)-unit for trick play, the method including: removing second half of prediction frames from total frames ranging from a IDR frame start position to the last prediction frame before a next IDR frame position; and generating the double-speed IDR-unit with the remaining frames when a data size of the remaining frames is less than a half of the data size of the total frames.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

DESCRIPTION OF SPECIFIC EMBODIMENTS

The advantages, features and aspects of the invention will become apparent from the following description of the embodiments with reference to the accompanying drawings, which is set forth hereinafter.

Figure 1:
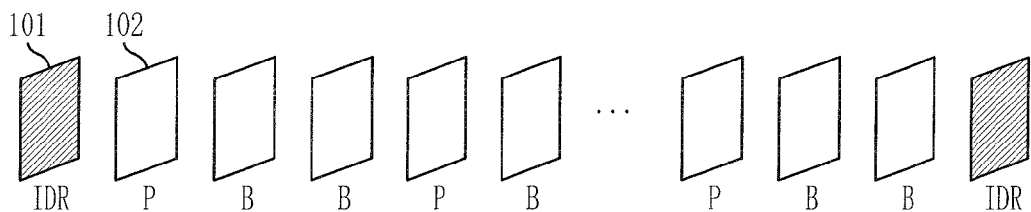
FIG. 1 is a view showing IDR frames and prediction frames used in an embodiment of the present invention.

FIG. 1 is a view showing IDR frame and its prediction frames used in an embodiment of the present invention.

As illustrated in FIG. 1, a video is comprised of a sequence of IDR frame and prediction frames. The IDR frame is a reference frame in H.264 standard, and P frames and B frames are prediction frames.

For example, if a video is 29.97 frames per second, it means that 29.97 frames are played back for 1 second, that is, one frame is displayed for 1000 ms/29.97. An H.264 video means that each frame or each picture is compressed based on H.264 compression method.

The H.264 compression method efficiently compresses the frames by determining the continuity of frames or the similarity between frames. For example, when the IDR frame 101 and the P frame 102 are very similar to each other, the P frame 102 is separately compressed after extracting only its different portion from the IDR frame 101. This method has higher compression efficiency than that in compressing the P frame 102. Since the P frame and the B frame are predicted from the IDR frame, they cannot be decoded if the IDR frame does not exist. That is, it is impossible to regenerate the frame by decompressing the video compressed by H.264 compression method.

Figure 2:
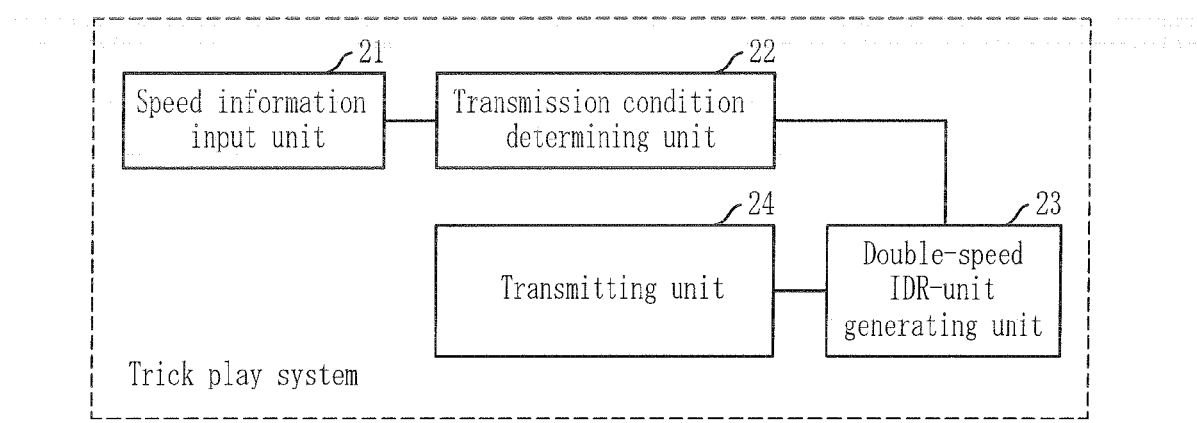
FIG. 2 is a block diagram of a trick play system using an IDR frame in accordance with an embodiment of the present invention.

FIG. 2 is a block diagram of a trick play system using an IDR frame in accordance with an embodiment of the present invention.

Referring to FIG. 2, the trick play system using the IDR frame in accordance with the embodiment of the present invention includes a speed information input unit 21, a transmission condition determining unit 22, a double-speed IDR-unit generating unit 23, and a transmitting unit 24. The speed information input unit 21 is configured to allow a user to input a speed value S, and the transmission condition determining unit 22 is configured to determine IDR-unit transmission conditions according to the inputted speed value S. The transmission conditions include IDR-unit transmission or skip operation. The double-speed IDR-unit generating unit 23 generates a double-speed IDR-unit by adjusting the number and data size of video frames to be transmitted according to the transmission conditions determined by the transmission condition determining unit 22. The transmitting unit 24 transmits the double-speed IDR-unit generated by the double-speed IDR-unit generating unit 23 to a user terminal. The transmitting unit 24 may use a known streaming method to transmit the double-speed IDR-unit to the user terminal.

The transmission condition determining unit 22 determines the IDR-unit transmission or the skip operation according to a value of (S/2−1), where S is the speed value inputted through the speed information input unit 21. More specifically, when (S/2−1)=0, the transmission condition determining unit 22 determines "IDR-unit transmission" operation. When (S/2−1)≠0, the condition determining unit 22 determines "skip to next IDR frame location". Then, after subtracting "1" from the value of (S/2−1), the transmission condition determining unit 22 determines if the subtraction result value is equal to 0. The above procedures are repeated until the subtraction result value is equal to 0.

The reason why the transmission condition determining unit 22 subtracts 1 from S/2 is that it need not process a double-speed operation because the double-speed IDR-unit generating unit 23 generates the double-speed IDR-unit by processing the video frame such that it becomes the double-speed.

The double-speed IDR-unit generating unit 23 receives prediction frames ranging from the start position of the current IDR frame to the start position of the next IDR frame, and removes the second half of the prediction frames arranged between two IDR frames. Then, the double-speed IDR-unit generating unit 23 controls the first half of the prediction frames such that the sum of their data sizes does not exceed half the sum of data sizes of the total prediction frames.

A procedure for trick playing the IDR frame and the prediction frames and a method for generating the double-speed IDR-unit will be described below with reference to FIGS. 3 and 4, respectively.

Figure 3:
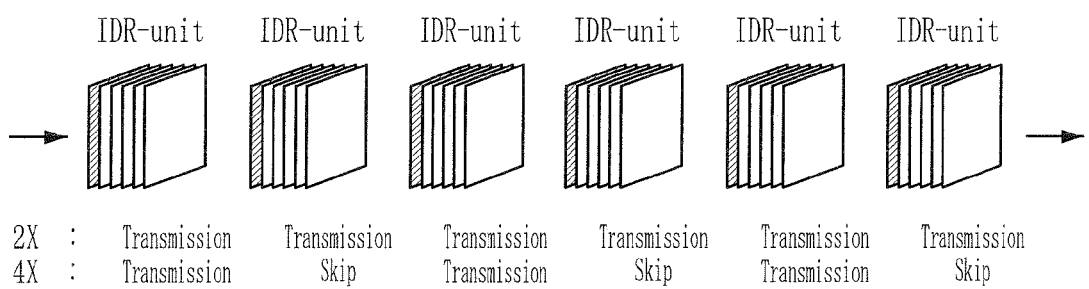
FIG. 3 is a view illustrating a procedure for trick playing IDR frames and prediction frames.

FIG. 3 is a view illustrating a procedure for trick playing the IDR frame and the prediction frames. Specifically, a procedure for trick playing the double-speed IDR-units generated based on a double-speed will be described below. The IDR-unit represents a frame unit to be "transmitted" or "skipped" at a time and it includes IDR frame and prediction frames.

When the user wants to play back pictures at double-speed, he or she inputs "2" as the speed value to the trick play system. The trick play system, especially the transmission condition determining unit 22, divides the inputted speed value by 2 to yield "1". Then, the resulting value obtained by subtracting 1 from "1" is equal to 0. Therefore, the transmission condition determining unit 22 determines the IDR-unit transmission operation for all IDR-units. Then, double-speed IDR-units are transmitted on the basis of the IDR-unit as illustrated in FIG. 3.

When the user wants to play back pictures at quadruple-speed, he or she inputs "4" as the speed value to the trick play system. The trick play system, especially the transmission condition determining unit 22, divides the inputted speed value by 2 to yield "2". Then, the resulting value obtained by subtracting 1 from "2" is equal to 1. Therefore, the transmission condition determining unit 22 determines the IDR-unit transmission and skip operation. That is, the transmission operation and the skip operation are repeated on the basis of the IDR-unit as illustrated in FIG. 3.

When assuming that the IDR frame is provided in every 30 frames, the conventional method executes the double-speed trick play by alternately performing the transmission operation and the skip operation of frame, but the method of the present invention executes the double-speed trick play by continuously performing 15 frames transmission operation and then continuously performing 15 frames skip operation.

The reason for this is that human's eyes do not greatly perceive 30 frames per second, so that the persons do not perceive the frame change when 15 frames are transmitted and then 15 frames are skipped. If the IDR frame is provided in every 10 seconds, the user may feel unnatural in the trick play. However, since one or more IDR frames are provided within 1 second as specified in Digital Multimedia Broadcasting (DMB) standard, the user does not feel unnatural in the trick play. Meanwhile, the user may feel unnatural if the IDR frame is provided in a relatively large interval and the trick play speed is based on the IDR-unit. Thus, the present invention provides a method for generating the double-speed IDR-unit capable of minimizing the unnatural feeling in the trick play.

Since a video compression, called a lossy compression, is to compress data while removing invisible portions, 100% of data cannot be recovered in this method, but the human eye will perceive the data as 100% recovered. Therefore, when only the different portions, or the changed portions, are extracted and compressed, slightly visible portions as well as invisible portions are removed. Thus, the loss of data is accumulated and thus an error increases.

To minimize the error, a reference frame is periodically inserted. As one example, the first frame is set to a reference frame and only different portions between the reference frame and next ten frames are compressed. Then, a next frame is set to a new reference frame and only different portions between the new reference frame and next ten frames are compressed. In the MPEG-2 standard, the above procedures are repeated in every 15 frames. In the MPEG-4 standard, the above procedures are repeated in every 30 frames.

When a file is played back at a double-speed, it is most efficient to play back the frames in every two frames. However, when IDR frames are removed, P frames and B frames compressed with reference to the IDR frames cannot be recovered. For example, an IDR frame disposed in the middle of a video consisting of a frame sequence of "IDR, P, P, B, B, IDR, P, B, B, B, IDR" is removed, the frames of "P, B, B, B" between the removed IDR frame and the next IDR frame are the useless compression frames, so that they are not recovered.

However, when a file is played back on the basis of IDR-unit, the problem that the IDR frames are removed can be solved. For example, a video (IDR, P, B, B), (IDR, P, B, B) and (IDR, P, B, B) can be played back at the double-speed by playing back only the first unit (IDR, P, B, B) and the third unit (IDR, P, B, B). This method can easily prevent the problem caused by the removal of the reference frame. However, when the IDR frame is present at long intervals, for example, when the IDR frame is present in every 1 second, a picture may be played back smoothly for 1 second, a picture may be removed for 1 second, a picture may be played back smoothly for 1 second, and then a picture may be removed for 1 second.

When the original video is compressed as follows: (IDR, P, B, B), (IDR, P, B, B), (IDR, P, B, B) and (IDR, P, B, B), it is played back at a double-speed as follows: (IDR, P), (IDR, P), (IDR, P) and (IDR, P), not in form of (IDR, P, B, B), (discard), (IDR, P, B, B) and (discard).

When the IDR-unit is compressed as follows: (IDR, P, B, B, P, B, B, P, B, B), how to divide it into the double-speed IDR-unit is important.

The simplest method is to extracts the first half (IDR, P, B, B, P) of the IDR group (IDR, P, B, B, P, B, B, P, B, B) and discard the last half (B, B, P, B, B) of the IDR-unit (IDR, P, B, B, P, B, B, P, B, B). In this case, the IDR-unit is divided by halves in terms of the number of frames, but is not actually a 50/50 split. In the case of the P frame and the B frame, only their difference from the IDR frame is compressed. Thus, data size of the P frame and the B frame is smaller than that of the IDR frame. For example, when data produced by compressing the IDR frame is 50 Kbytes, the case of the P frame is 20 Kbytes and the case of the B frame is 10 Kbytes. Therefore, in terms of IDR-unit data size, the first half (IDR, P, B, B, P) of the IDR-unit is a total 110 Kbytes (=50+20+10+10+20), and the last half (B, B, P, B, B) is a total 60 Kbytes (=10+10+20+10+10). When the divided IDR-units as above are transmitted from the server to the client, a bit rate is increased. The original video is 110+60 Kbytes in transmitting 10 frames, i.e., average 160/10 Kbytes per frame. When the video is played back at the double-speed, it becomes 110 Kbytes in transmitting 5 frames, average 110/5 Kbytes per frame. Thus, the average bit rate greatly increases. It is also important to divide the IDR-unit considering the bit rate rather than to simply divide 10 frames into halves.

The method for generating the double-speed IDR-unit will be described below in more detail with reference to FIG. 4.

Figure 4:
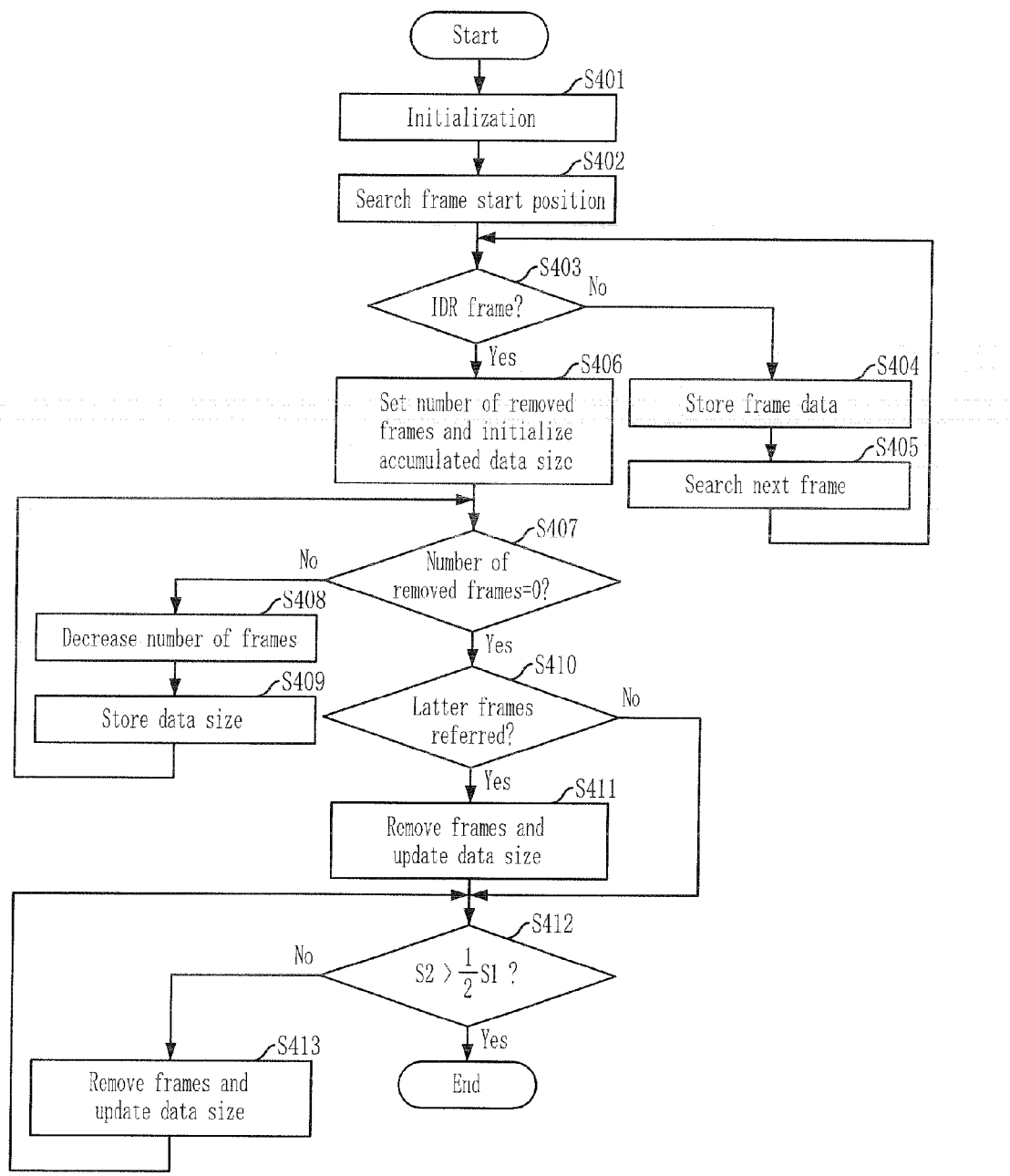
FIG. 4 is a flowchart illustrating a method for generating a double-speed IDR-unit for trick play in accordance with an embodiment of the present invention.

FIG. 4 is a flowchart illustrating the method for generating a double-speed IDR-unit for trick play in accordance with an embodiment of the present invention. It will be assumed herein that 15 frames are present between the IDR frame and the next IDR frame. F0 is the IDR frame, F1 to F15 are the prediction frames, and F16 is the next IDR frame.

In order to maintain a bit rate of the original contents without placing a load on the server in generating the double-speed IDR-unit, the trick play system makes the data size of the frames, which will be generated based on the double-speed IDR-unit, have half the data size of the frames from the IDR frame F0 to the next IDR frame F16. The trick play system takes the first half of the frames including the IDR frame and removes the second half of the frames, and uses a stack for efficiently performing their operation. The use of the stack is efficient because the frames can be removed in a reverse order from the second half of the frames.

In step S401, the trick play system initializes number (N1) of successive frames including the IDR frame and size (S1) of successive compressed frames including the IDR frame so as to search the start position (IPos) of the inputted IDR frame, i.e., N1=0 and S1=0.

In steps S402 and S403, the trick play system searches the frame start position F1 and determines if the current frame is the IDR frame F16. The trick play system may search the frame start position F1 according to a method specified in "ISO 14496-10".

In step S404, when it is determined in step S403 that the current frame is not the IDR frame F16, the trick play system accumulates the number (N1) and the size (S1) of the frames until the current frame and stores them in the stack, i.e., N1=N1+1 and S1=S1+size of the current frame. In step S405, the trick play system searches the next frame. The trick play system repeats the steps S403 to S405 until the searched frame becomes IDR frame F16.

In step S406, when it is determined in step S403 that the current frame is the IDR frame F16, the trick play system sets the number (N2) of the removed frames to N1/2 and initializes the accumulated data size (S2) of the removed frames so as to trick play half of the frames arranged between the IDR frame F0 to the next IDR frame F16, i.e., N2=N1/2 and S2=0.

The number (N2) of the removed frames is set to N1/2 so as to trick play half of the frames stored in the stack. N1 representing the number of the frames F0 to F16 is equal to 16, and N2 is equal to 8.

In step S408, the trick play system removes one of the second half of the total frames F0 to F15 stored in the stack and decreases the number (N2) of the removed frames by 1, i.e., N2=N2−1. In step S409, the trick play system repeats the step S409 of accumulating the data size (S2) of the second half of the frame F0 to F15 and storing the accumulated data size, i.e., S2=(S2+frame size). In step S407, the trick play system repeats the steps S408 and S409 until the number (N2) of the removed frames becomes 0. Since N2=8, the steps S407 to 409 are performed a total of eight times.

In step S410, the trick play system determines if there exist the first half F0 to F7 of the frames referring to the removed frames F8 to F15. In step S411, if the first half of the frames do not refer to the second half F8 to F15 of the frames, they are maintained without change. On the other hand, if the first half of the frames refers to the second half F8 to F15 of the frames, the corresponding frames are removed and the accumulated data size (S2) of the removed frames is updated.

In step S412, the trick play system determines if the accumulated data size (S2) of the removed frames exceeds half the data size (S1) of the total frames F0 to F15 (S1<S2×2). That is, the trick play system determines if the data size of the remaining frames is less than half the data size of the total frames F0 to F15. When it is determined in step S412 that the accumulated data size (S2) of the removed frames exceeds half the data size (S1) of the total frames F0 to F15, that is, the data size of the remaining frames are less than half the data size of the total frames F0 to F15, the double-speed IDR-unit including the frames ranging from the IDR frame F0 to the frame satisfying the above condition is generated because it determines that it can maintain the bit rate of the original contents without placing a load on the server.

In step S413, when it is determined in step S412 that the accumulated data size (S2) of the removed frames is less than half the data size (S1) of the total frames F0 to F15, that is, the data size of the remaining frames are more than half the data size of the total frames F0 to F15, the trick play system removes the remaining frames in a reverse order one by one and updates the accumulated data size (S2) of the removed frames, and returns to the step S412.

In the method for generating the double-speed IDR-unit for trick play, the operation of removing the second half of the total frames arranged between the two IDR frames is performed for making the double-speed IDR-unit be approximately at double-speed. The operation of controlling the sum of the data sizes of the first half of the frames not to exceed half the data size of the total frames is performed so that the bit rate of the double-speed IDR-unit to be generated cannot exceed the bit rate of the original contents.

Figure 5:
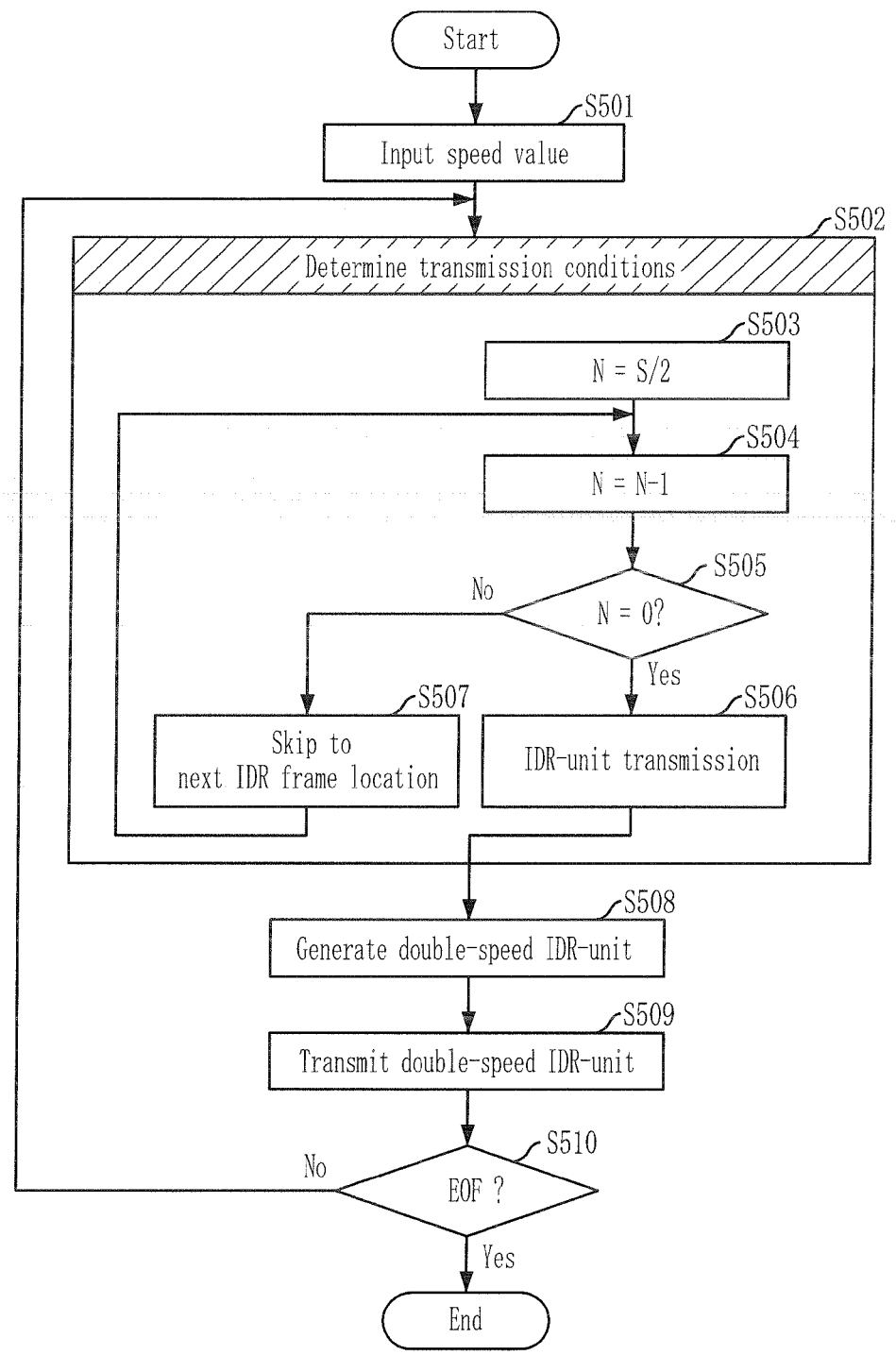
FIG. 5 is a flowchart illustrating a trick play method using the double-speed IDR-unit in accordance with an embodiment of the present invention.

FIG. 5 is a flowchart illustrating a trick play method using the double-speed IDR-unit in accordance with an embodiment of the present invention.

Referring to FIG. 5, the trick play system receives the speed value (S) inputted by the user in step S501 and determines the transmission conditions based on the inputted speed value (S) in step S502.

In step S503 and S504, the trick play system divides the inputted speed value (S) by 2, i.e., N=S/2, and subtracts 1 from N=S/2, i.e., N=N−1. In step S505, the trick play system determines if the value of N is equal to 0. In step S506, if the value of N is equal to 0, the trick play system determines the IDR-unit transmission. In step S507, if the value of N is not equal to 0, the trick play system determines the skip to the next IDR frame location, and logic flow goes to the step S504.

Then, the trick play system subtracts "1" from the value of N and determines the skip to the next IDR frame location if the subtraction result value is not equal to 0. The above procedures are repeated until the subtraction result value of N is equal to 0.

In step S508, the trick play system generates the double-speed IDR-unit to be transmitted.

In case of a quadruple-speed, the transmission operation and the skip operation can be repeated as illustrated in FIG. 3. Also, the skip operation and the transmission operation can be repeated as above description.

Since the procedures for generating the double-speed IDR-unit has been described above with reference to FIG. 4, a detailed description thereof will be omitted.

In step S509, the trick play system transmits the double-speed IDR-unit, which is generated in steps S508 according to the determination of step S506, to the user terminal by using a known streaming method.

In step S510, the trick play system determines whether or not an end of file (EOF). If it is not the EOF, and logic flow goes to the step S502.

The methods in accordance with the embodiments of the present invention can be realized as programs and stored in a computer-readable recording medium that can execute the programs. Examples of the computer-readable recording medium include CD-ROM, RAM, ROM, floppy disks, hard disks, magneto-optical disks and the like.

As described above, since the double-speed IDR-unit is generated, the trick play speed can be automatically controlled at the double-speed. The trick play speed can be again controlled by the successive transmission for double-speed or the repetition of skipping the IDR-unit, and generating and transmitting the double-speed IDR-unit for a quadruple-speed according to the transmission conditions.

Although the method for generating the double-speed IDR-unit for trick play has been applied to the trick play system in the above exemplary embodiments of the present invention, the present invention is not limited thereto. The method of the present invention can also be applied to a variety of systems, such as VCR.

In accordance with the embodiments of the present invention, the trick play service can be provided in real time because the bit rate of the original contents is maintained without placing a heavy operation load on the server.

Further, the trick play can be implemented without using special encoding scheme or modifying the user terminal. Thus, the trick play service can be provided without modification of the original contents and the user terminal The present invention can be applied to H.264 VoD system and so on.

While the present invention has been described with respect to the specific embodiments, it will be apparent to those skilled in the art that various changes and modifications may be made without departing from the spirit and scope of the invention as defined in the following claims.

What is claimed is:

1. A trick play system, comprising:
a transmission condition determining unit configured to determine instantaneous decoding refresh (IDR) transmission conditions based on a received speed value; and
a double-speed IDR-unit generating unit configured to generate a double-speed IDR-unit by adjusting the number and data size of video frames to be transmitted in accordance with the transmission conditions determined by the transmission condition determining unit;
wherein the double-speed IDR-unit generating unit receives total frames including an IDR frame and a plurality of prediction frames between the IDR frame and an immediately next IDR frame, removes a latter half of prediction frames from the total frames, and generates the double-speed IDR-unit with the remaining frames when a data size of the remaining frames is less than half of the data size of the total frames; and
wherein the double-speed IDR-unit generating unit removes frames referring to the removed prediction frames from the remaining frames.

2. The trick play system of claim 1, wherein the transmission condition determining unit determines transmission or skip of IDR-unit according to a value of (S/2−1), where S represents the speed value.

3. The trick play system of claim 2, wherein the transmission condition determining unit determines to transmit the IDR-unit if the value of (S/2−1) is equal to 0, and to skips as many as (S/2−1) IDR-units after generation and transmission of the double-speed IDR-unit if the value of (S/2−1) is not equal to 0.

4. The trick play system of claim 2, wherein the transmission condition determining unit determines to transmit the IDR-unit if the value of (S/2−1) is equal to 0, and wherein the transmission condition determining unit subtracts "1" from the value of (S/2−1) if the value of (S/2−1) is not equal to 0, skips to a next IDR frame when the subtraction result value is not equal to 0, repeats the subtraction and the skip until the subtraction result value is equal to 0 and determines to transmit the IDR-unit.

5. The trick play system of claim 1, wherein the double-speed IDR-unit generating unit uses a stack to remove the latter half of the prediction frames in a reverse order.

6. A trick play method, comprising:
receiving a speed value;
determining instantaneous decoding refresh (IDR) transmission conditions based on the speed value;
generating a double-speed IDR-unit by adjusting the number and data size of video frames to be transmitted in accordance with the determined transmission conditions; and
transmitting the generated double-speed IDR-unit to a user terminal;
wherein the generating the double-speed IDR-unit includes:
removing a latter half of prediction frames from total frames ranging from a first IDR frame start position to the last prediction frame before a second IDR frame start position;
generating the double-speed IDR-unit with the remaining frames when a data size of the remaining frames is less than a half of the data size of the total frames;
removing frames referring to the removed prediction frames from the remaining frames; and
returning to the step of generating the double-speed IDR-unit.

7. The trick play method of claim 6, wherein the determining the transmission conditions includes determining IDR-unit transmission or skip according to a value of (S/2−1), where S represents the speed value.

8. The trick play method of claim 7, wherein the determining the transmission conditions includes:
determining to transmit the IDR-unit when the value of (S/2−1) is equal to 0; and
skipping as many as (S/2−1) IDR-units after generation and transmission of the double-speed IDR-unit if the value of (S/2−1) is not equal to 0.

9. The trick play method of claim 7, wherein the determining the transmission conditions includes:
determining to transmit the IDR-unit when the value of (S/2−1) is equal to 0;
subtracting "1" from the value of (S/2−1) when the value of (S/2−1) is not equal to 0;
skipping to a next IDR frame when the subtraction result value is not equal to 0; and
repeating the subtraction and the skip until the subtraction result value is equal to 0 and determining to transmit the IDR-unit.

10. The trick play method of claim 6, further comprising:
removing frames referring to the removed latter half of prediction frames from the remaining frames; and
returning to the step of generating the double-speed IDR-unit with the remaining frames.

11. The trick play method of claim 10, wherein the removing the latter half of prediction frames includes:
removing the latter half of the prediction frames in a reverse order based on a stack.

12. A method for generating a double-speed instantaneous decoding refresh (IDR)-unit for trick play, the method comprising:
removing a latter half of prediction frames from total frames ranging from a IDR frame start position to the last prediction frame before a next IDR frame position; and
generating the double-speed IDR-unit with the remaining frames when a data size of the remaining frames is less than a half of the data size of the total frames;
wherein the generating the double-speed IDR-unit includes:
determining if the data size of the remaining frames is less than a half of the data size of the total frames;
additionally removing a latter half of frames from the remaining frames when the data size of the remaining frames is equal to or greater than a half of the data size of the total frames;
generating the double-speed IDR-unit with the remaining frames when the data size of the remaining frames is less than a half of the data size of the total frames;
removing frames referring to the removed prediction frames from the remaining frames; and
returning to the step of generating the double-speed IDR-unit.

13. The method of claim 12, wherein the removing the latter half of the prediction frames in a reverse order based on a stack.

* * * * *